(12) United States Patent
Lupke et al.

(10) Patent No.: US 11,034,073 B2
(45) Date of Patent: Jun. 15, 2021

(54) METHOD FOR FORMING INLINE TRIPLE WALL COUPLING CONNECTOR

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 726 days.

(21) Appl. No.: 15/531,036

(22) PCT Filed: Nov. 27, 2015

(86) PCT No.: PCT/CA2015/000585
§ 371 (c)(1),
(2) Date: May 26, 2017

(87) PCT Pub. No.: WO2016/082024
PCT Pub. Date: Jun. 2, 2016

(65) Prior Publication Data
US 2017/0321829 A1 Nov. 9, 2017

(30) Foreign Application Priority Data
Nov. 28, 2014 (CA) .................................. CA 2872849

(51) Int. Cl.
*B29C 48/09* (2019.01)
*F16L 11/15* (2006.01)
(Continued)

(52) U.S. Cl.
CPC .......... *B29C 48/09* (2019.02); *B29C 48/0017* (2019.02); *B29C 48/0021* (2019.02);
(Continued)

(58) Field of Classification Search
CPC .................................................. B29C 48/0017
See application file for complete search history.

(56) References Cited

U.S. PATENT DOCUMENTS

| 4,500,284 A | * | 2/1985 | Lupke | B29C 48/303 |
|---|---|---|---|---|
| | | | | 425/511 |
| 4,510,013 A | * | 4/1985 | Lupke | B29C 48/30 |
| | | | | 156/498 |

(Continued)

FOREIGN PATENT DOCUMENTS

| CA | 2372125 A1 | 5/2003 |
|---|---|---|
| CA | 2681901 C | 5/2017 |

(Continued)

OTHER PUBLICATIONS

ISA/CA, International Search Report and Written Opinion for PCT/CA2015/000585 dated Feb. 26, 2016.

*Primary Examiner* — Atul P. Khare
(74) *Attorney, Agent, or Firm* — Cahn & Samuels, LLP

(57) ABSTRACT

A pipe coupling for triple wall corrugated plastic pipe includes a triple wall corrugated bellmouth connector that is of a unitary construction with one end of the corrugated plastic pipe. This bellmouth connector is of higher strength and in cooperation with the two wall corrugated spigot provides a high strength coupling. This coupling includes the bellmouth connector and spigot that are made inline with the corrugated pipe. A method for the manufacture of the pipe includes controlling of an air pressure on the outside of a formed two wall corrugated pipe as an exterior third wall is secured thereto.

4 Claims, 7 Drawing Sheets

(51) Int. Cl.
| | |
|---|---|
| *B29C 49/00* | (2006.01) |
| *F16L 25/00* | (2006.01) |
| *B29D 23/18* | (2006.01) |
| *B29C 65/00* | (2006.01) |
| *B29C 69/00* | (2006.01) |
| *B29C 65/56* | (2006.01) |
| *B29D 23/00* | (2006.01) |
| *B29C 57/04* | (2006.01) |
| *B29C 48/00* | (2019.01) |
| *B29C 48/151* | (2019.01) |
| *B29C 48/30* | (2019.01) |
| *F16L 11/20* | (2006.01) |
| *F16L 21/02* | (2006.01) |
| *B29L 23/00* | (2006.01) |
| *B29L 23/18* | (2006.01) |

(52) U.S. Cl.
CPC ......... *B29C 48/151* (2019.02); *B29C 48/303* (2019.02); *B29C 49/0015* (2013.01); *B29C 57/04* (2013.01); *B29C 65/565* (2013.01); *B29C 66/1282* (2013.01); *B29C 66/1286* (2013.01); *B29C 66/12861* (2013.01); *B29C 66/5221* (2013.01); *B29C 66/721* (2013.01); *B29C 69/001* (2013.01); *B29C 69/008* (2013.01); *B29D 23/003* (2013.01); *B29D 23/18* (2013.01); *F16L 11/15* (2013.01); *F16L 11/20* (2013.01); *F16L 21/022* (2013.01); *F16L 25/0063* (2013.01); *B29C 2793/0072* (2013.01); *B29L 2023/186* (2013.01); *B29L 2023/22* (2013.01)

(56) References Cited

U.S. PATENT DOCUMENTS

| | | | | |
|---|---|---|---|---|
| 5,330,600 | A * | 7/1994 | Lupke | B29C 43/222 |
| | | | | 156/242 |
| 5,405,569 | A * | 4/1995 | Lupke | B29C 48/303 |
| | | | | 264/504 |
| 6,053,214 | A * | 4/2000 | Sjoberg | F16L 11/15 |
| | | | | 138/134 |
| 6,155,813 | A * | 12/2000 | Lupke | B29C 48/30 |
| | | | | 425/326.1 |
| 6,399,002 | B1 | 6/2002 | Lupke | |
| 7,214,051 | B2 * | 5/2007 | Lupke | B29C 49/783 |
| | | | | 425/336 |
| 7,625,196 | B2 * | 12/2009 | Lupke | B29C 49/783 |
| | | | | 425/133.1 |
| 7,988,438 | B2 * | 8/2011 | Sutton | B29C 48/13 |
| | | | | 425/113 |
| 8,114,324 | B2 * | 2/2012 | Sutton | B29C 48/08 |
| | | | | 264/171.29 |
| 8,579,624 | B2 * | 11/2013 | Sutton | F16L 25/0054 |
| | | | | 425/296 |
| 8,733,405 | B2 * | 5/2014 | Goddard | F16L 9/00 |
| | | | | 138/121 |
| 8,820,800 | B2 * | 9/2014 | Sutton | F16L 25/0054 |
| | | | | 285/374 |
| 8,820,801 | B2 | 9/2014 | Sutton | |
| 2010/0224306 | A1 | 9/2010 | Sutton | |
| 2017/0217074 | A1 * | 8/2017 | Lupke | B29C 48/21 |

FOREIGN PATENT DOCUMENTS

| | | | |
|---|---|---|---|
| CN | 102767651 A | 11/2012 | |
| DE | 29920442 U1 * | 2/2000 | .......... F16L 25/0045 |

* cited by examiner

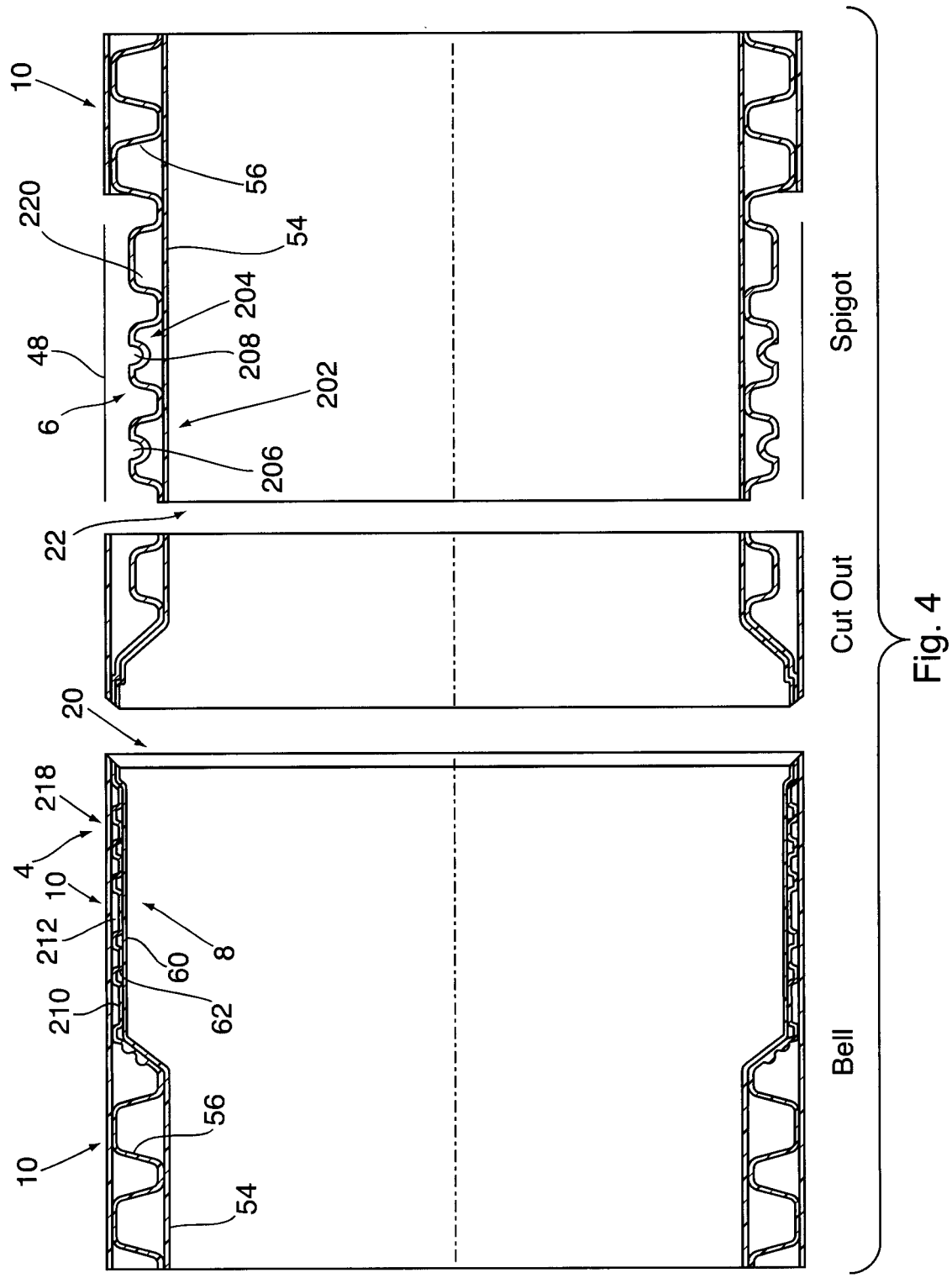

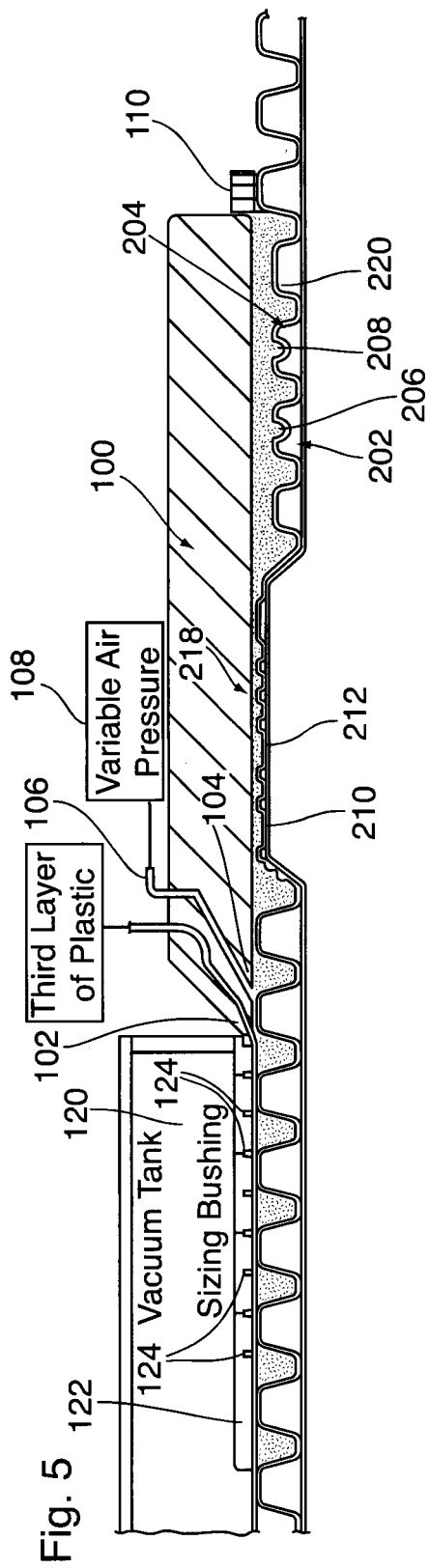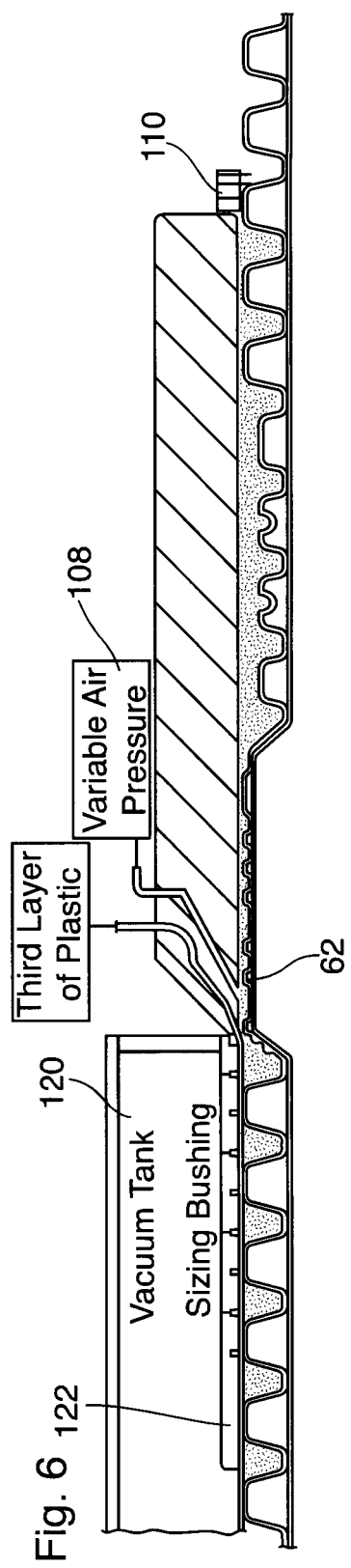

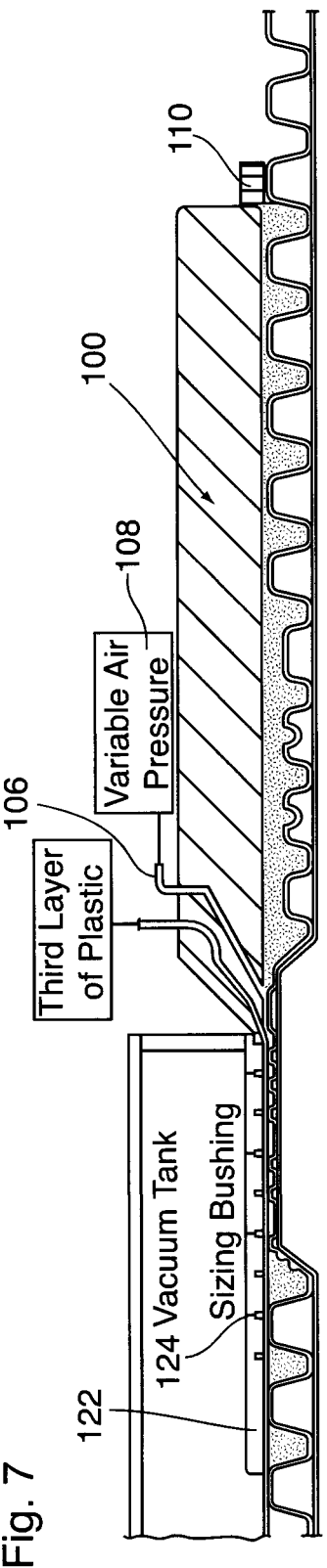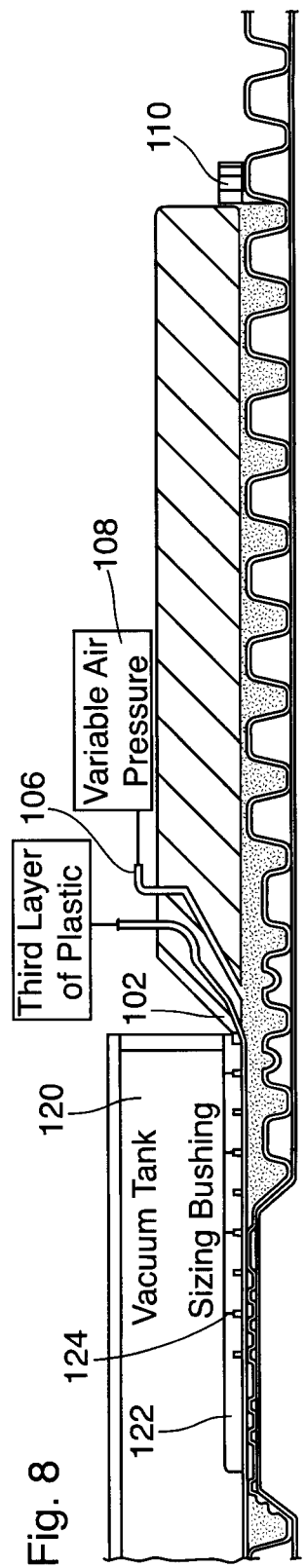

Fig. 9A  Bell
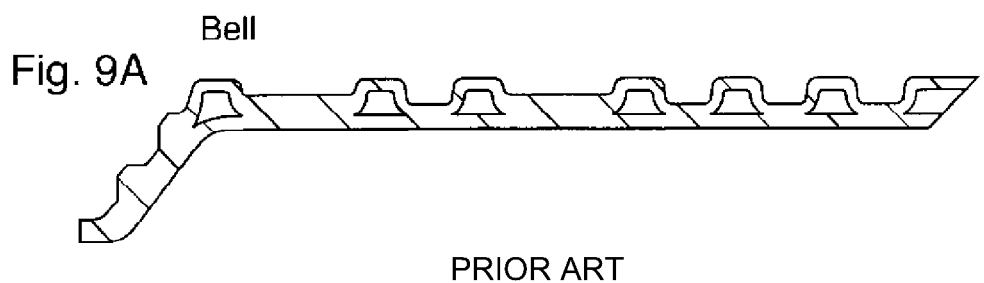
PRIOR ART
Fig. 9B
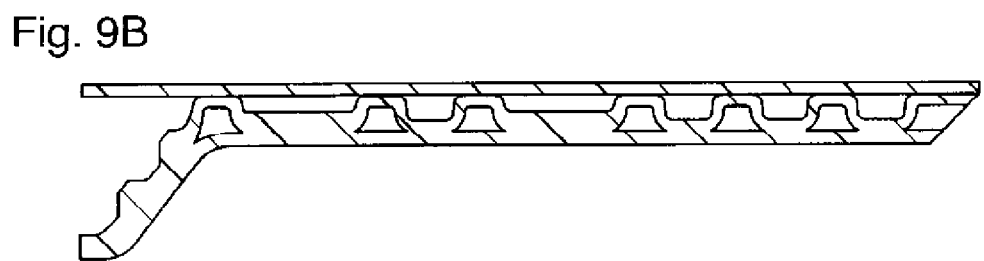
Fig. 9C  Bell & Spigot Assembly
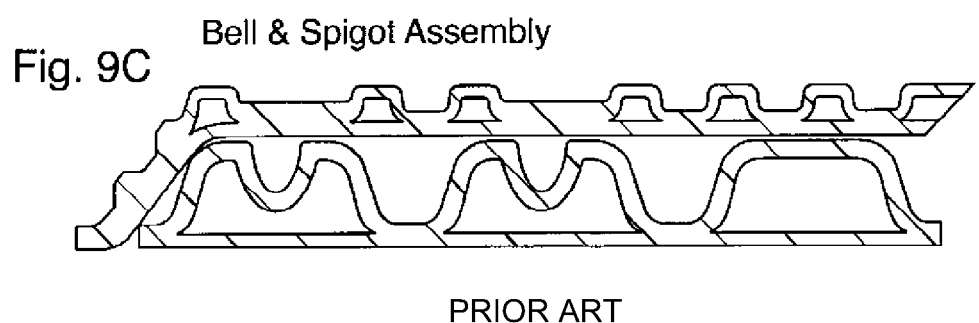
PRIOR ART
Fig. 9D
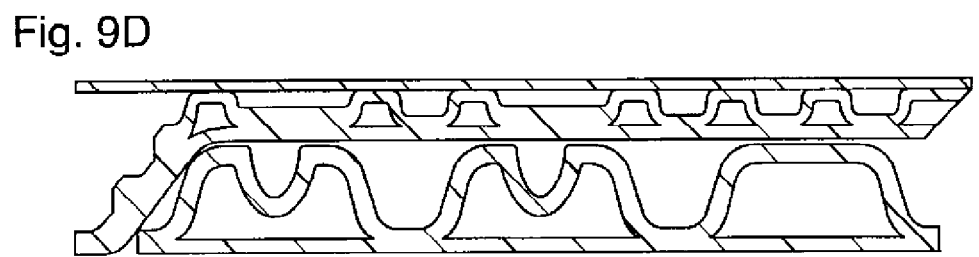

METHOD FOR FORMING INLINE TRIPLE WALL COUPLING CONNECTOR

FIELD OF THE INVENTION

The present invention relates to corrugated pipes and methods for forming of corrugated plastic pipe having a triple wall construction and an inline connector.

BACKGROUND OF THE INVENTION

Triple wall corrugated pipe and a method of manufacture specific to triple wall pipe is disclosed in our earlier U.S. Pat. No. 6,399,002 and a further variation of a triple wall corrugated pipe having a triple wall spigot is shown in U.S. Pat. No. 8,820,801.

U.S. Pat. No. 6,399,002 discloses a manufacturing method for forming triple wall corrugated pipe where a third outer wall is applied to a previously formed two wall corrugated pipe. The two wall corrugated pipes are produced using extrusion equipment having two die outlets and a series of reciprocating mold blocks which move with the plastic pipe during the manufacture thereof. The mold blocks define the outer corrugated shape of the pipe and the mold blocks also assist in cooling of the molten plastic. An inner wall is typically applied to the corrugated outer wall. The inner wall is of a tubular or cylindrical shape and provides a smooth interior wall of the pipe secured to the inner edge of the corrugated outer wall. Double wall spigots and double wall bellmouth connectors (sized to receive a spigot) are commonly used to couple one pipe section to another.

The purpose of manufacturing corrugated plastic pipe having a double wall construction is to provide good strength and durability of the pipe particularly with respect to collapse or crushing of the pipe.

For many applications it is desirable to manufacture this type of pipe with a spigot at one end and a bellmouth connector at an opposite end of a pipe section forming a unitary construction that allows coupling of one pipe section to another pipe section. Basically a mechanical type seal is made by inserting the spigot of one pipe section into the bellmouth connector of a second pipe section.

The normal practice in the manufacture of two wall corrugated pipe is to use circulating mold blocks to shape the pipe during the extrusion thereof and at selective points form a coupling between two pipe sections where the coupling is integral or unitary with the pipe. This coupling includes the bellmouth connector and a separate spigot that are essentially one after the other between adjacent pipe sections. At a downstream position the coupling is cut to free the bellmouth connector from the spigot such that the spigot is attached to one section of pipe and the bellmouth connector is attached to a different section of pipe. Typically there is a transition portion of the pipe between the bellmouth connector and the spigot which is removed from the extruded pipe during the cutting of the bellmouth connector and the spigot.

Double wall corrugated pipe is relatively strong however for some applications it is desirable to provide additional strength. The size of the corrugations and the wall thicknesses can be increased to provide additional strength but thicker wall sections impact the manufacturing speed and product cost. Larger corrugations require different mold blocks leading to high capital cost. It is also known to use a vacuum tank and a sizing die to attach an outer tubular third wall to reinforce and increase the strength of the double wall corrugated pipe.

Both double and triple wall corrugated plastic pipe are relatively strong however the maximum rating of the pipe sections is often limited by the strength of the bellmouth connector and spigot coupling where a spigot of one pipe section is inserted in a bellmouth connector of another pipe section. The rated load for these couplings can significantly reduce the rated strength of the overall pipe.

It is therefore desirable to provide a high strength bellmouth connector and spigot coupling that can be manufactured inline with the continuous manufacture of pipe.

The applicant has found that it is possible to increase the strength of the bellmouth connector/spigot coupling if the bellmouth connector includes a triple wall corrugated wall configuration. This type of triple wall corrugated connecting bellmouth connector is advantageously used with a double wall spigot structure. The triple wall bellmouth connector in combination with the double wall spigot forms a high strength coupling and as such the rated strength of the pipe section is increased.

SUMMARY OF THE INVENTION

A reinforced corrugated plastic pipe according to the present invention comprises an elongate corrugated pipe section having a first end and a second end. A spigot is formed at the first end of the pipe section and a bellmouth connector is formed at a second end of the pipe section as part of the pipe manufacture. The spigot is sized for receipt in the bellmouth connector allowing one pipe section to be coupled to a second pipe section continuing the length of pipe. The elongate corrugated pipe section, the spigot and the bellmouth connector have an inner wall that forms a smooth inner tube and a corrugated intermediate wall attached to and extending in a length of the corrugated plastic pipe. The inner wall of the pipe section and the inner wall of the spigot are of the same size and shape and align when a spigot is inserted in a bellmouth connector. The corrugated pipe section and the bellmouth connector further include a smooth outer wall attached to the corrugated intermediate walls and positioned opposite to the inner wall.

According to an aspect of the invention, the corrugated intermediate wall of the bellmouth connector together with the inner wall and outer wall of the bellmouth connector form an alternating series of double inner wall portions and double outer wall portions. The corrugated intermediate wall of the spigot forms a series of spaced double inner wall portions and includes a first receiving valley sized to receive a sealing ring on an outer surface of a corrugation. The first receiving valley is spaced from the end of the spigot and positioned such that when a spigot of a second corrugated plastic pipe is fully inserted into the bellmouth connector of the first corrugated pipe section, the first receiving valley is positioned opposite a first support crest forming a double inner wall portion of the bellmouth connector.

According to an aspect of the invention, the outer wall of the bellmouth connector has a diameter the same as the outer wall of the corrugated pipe section.

In yet a further aspect of the invention, the corrugator wall of the spigot includes a second receiving valley for receiving a ceiling ring. The second receiving valley is spaced from the first receiving valley and positioned such that when a spigot of a second pipe section is fully inserted into the first pipe section, the first receiving valley and the second receiving valley are positioned opposite a first support crest and a second support crest respectively of said bellmouth connector. The second support crest forms a double inner wall portion of the bellmouth connector.

In yet a further aspect of the invention the first support crest and the second support crest are separated by a strengthening crest for forming a double inner wall portion of the bellmouth connector. The spigot of a second pipe section, when fully inserted into the bell connector of the first pipe section, has the strengthening crest positioned opposite a valley forming a double inner wall portion of the spigot.

In yet a further aspect of the invention, the first support crest and the second support crest both have a length greater than the length of the strengthening crest.

In yet a further aspect of the invention, the double inner wall support crests have a length at least one and a half times the length of the double inner wall of the strengthening crest.

The present invention is also directed to a pipe coupling formed when two pipe sections are mechanically connected by means of a spigot on one end of one of the pipe sections and a bellmouth connector on the end of the other pipe section. Each pipe section includes a smooth inner wall, a corrugated intermediate wall attached to the smooth inner wall and a smooth outer wall attached to the corrugated intermediate wall opposite the smooth inner wall. The bellmouth connector is sized to receive and form a mechanical connection with the spigot of the other pipe section. Both the bellmouth connector and spigot have a smooth inner wall and a corrugated intermediate wall attached to the smooth inner wall. The bellmouth connector also includes an outer wall attached to the intermediate corrugated wall and is generally opposite the smooth inner wall. The corrugated intermediate wall of the bellmouth connector forms an alternating series of double inner wall portions and double outer wall portions with the inner wall and outer wall respectively. The spigot has a smooth inner wall and a corrugated wall attached to the outside of the smooth inner wall. The spigot is of a length to be fully received and generally extend the full length of the bellmouth connector and includes at least two sealing rings on the exterior of crests of the spigot that engage with and form a support surface with the inner wall of the bellmouth connector.

In a further aspect of the invention, the spigot includes a first receiving valley positioned on one of the corrugations of the spigot which receives a sealing ring in said valley and extending beyond the corrugation of the spigot. The receiving valley, when the spigot is fully inserted in the bellmouth connector, is positioned opposite a support crest formed by a double inner wall portion of the bellmouth connector.

The present invention is also directed to a method of forming an inline coupling in a triple wall corrugated pipe having an inner smooth tubular wall joined to a corrugated intermediate wall which is joined to an outer sleeve wall. The coupling includes a bellmouth connector and a spigot sized for receipt in the bellmouth connector. The method comprises providing coupling mold blocks inline with the corrugated pipe mold blocks and using the coupling mold blocks to draw extruded plastic normally forming the corrugated intermediate wall outwardly to form a corrugated intermediate wall of the bellmouth connector and a corrugated wall of said spigot as said coupling mold blocks move past an intermediate wall die outlet. Air pressure is used to move extruded plastic normally forming the inner wall outwardly against an inner surface of said corrugated intermediate wall of said bellmouth connector and against an inner surface of said corrugated wall of said spigot. Subsequently applying the plastic normally forming the outer sleeve wall to join with an outer surface of said corrugated intermediate wall of said bellmouth connector to bridge between corrugations thereof and providing a positive pressure to maintain the plastic normally forming said outer sleeve wall of said pipe away from the corrugated outer surface of the spigot as the spigot moves past an outlet of the plastic such that the plastic is spaced outwardly away from the spigot.

According to an aspect of the method, the inline coupling includes a double wall corrugated spigot and associated bellmouth connector with both including a cylindrical inner wall positioned to align with an inner cylindrical wall of said triple wall corrugated pipe and said bellmouth connector has an inner wall sized to receive a spigot therein. The method comprises using a series of travelling mold blocks in combination with extrusion equipment for forming said inner walls of said pipe sections and said corrugated walls of said bellmouth connector and said spigot. Applying after the formation of said inner walls and said corrugated walls an outer sleeve wall joined to said corrugated walls of said pipe sections and said bellmouth connector. Providing air pressure to maintain said applied outer sleeve wall spaced outwardly and out of contact with said corrugated wall of said spigot and subsequently removing the outer sleeve wall from the area over the spigot.

In yet a further aspect of the method a cutting step is provided where the formed triple wall pipe is cut at each coupling separating the spigot and bellmouth connector.

In yet a further aspect of the invention, the method includes forming a seal with the corrugations of the formed corrugations of the pipe section using a vacuum tank and sizing bushing after extruding the outer sleeve wall to engage and position said outer sleeve wall in contact with the corrugated wall of said pipe sections and said corrugated wall of the bellmouth connector.

BRIEF DESCRIPTION OF THE DRAWINGS

Preferred embodiments of the invention are shown in the drawings, wherein:

FIG. 4 is a partial view showing two pipe sections with the connection cut at two locations such that a disposable cut out portion is removed;

FIGS. 5 through 8 show a particular structure and method for forming of the triple wall corrugated pipe sections with a triple wall bell connection; and FIGS. 9A, 9B, 9C and 9D show a double wall bell connection, a triple wall bell connection, a double wall bell and spigot assembly and a triple wall bell and spigot assembly.

DETAILED DESCRIPTION OF THE PREFERRED EMBODIMENTS

Figure 1:
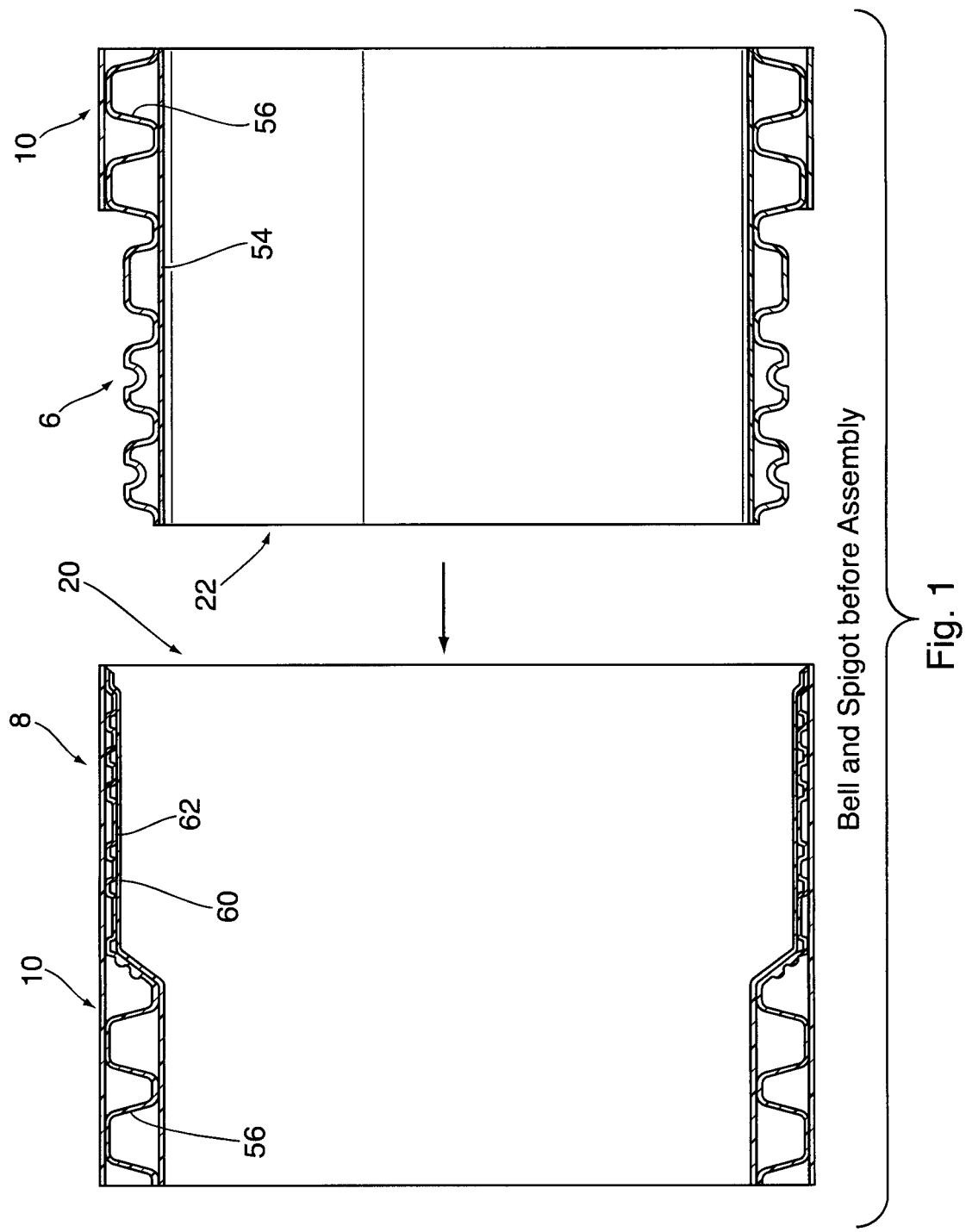
FIG. 1 is a partial view of two pipe sections with one pipe section having a bellmouth connector and the other pipe section showing the spigot connection thereof.
Figure 2:
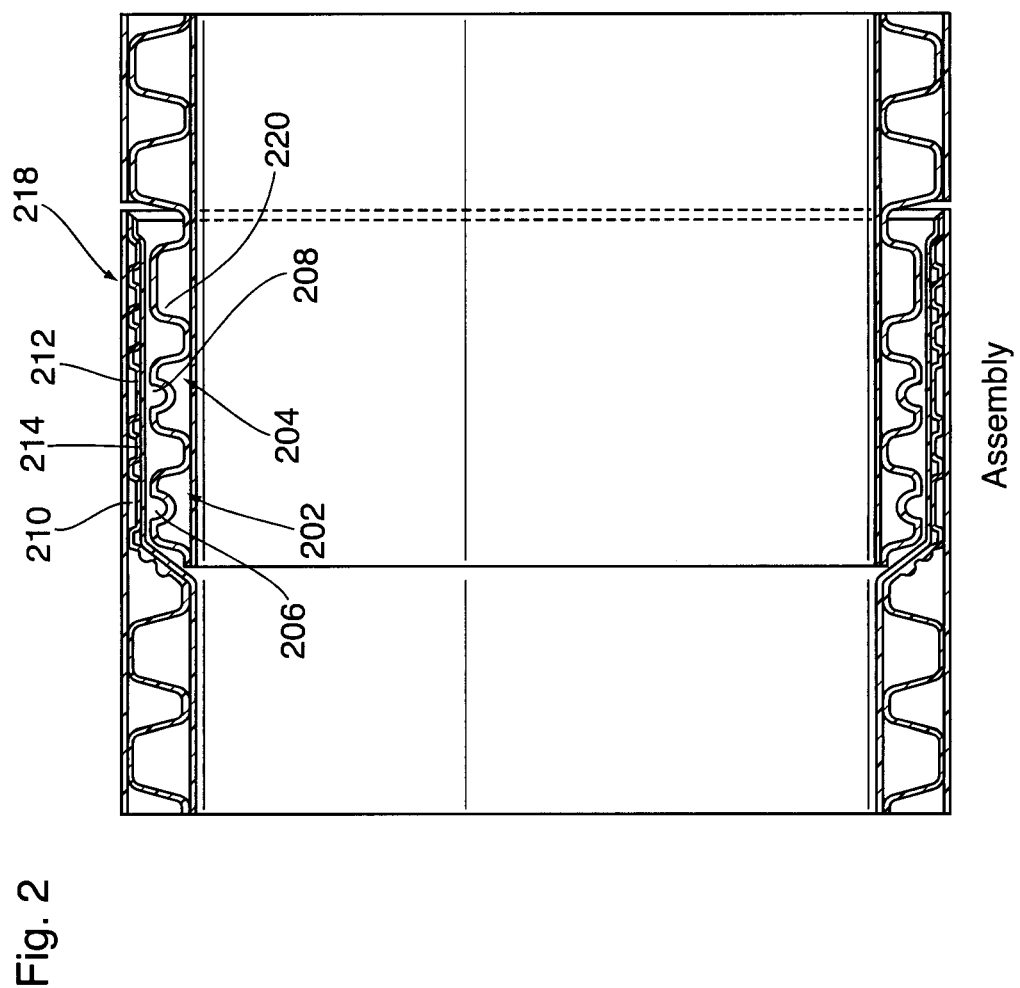
FIG. 2 is an assembled version of the two pipe sections of FIG. 1 where the spigot of one pipe section has been inserted into and couples with the bellmouth connector of the second pipe connection.

FIGS. 1 and 2 show two pipe sections 20 and 22 and a coupling 4 that includes a bellmouth connector 8 and spigot 6 used for coupling pipe sections on a job site. These pipe sections are cut from corrugated pipe 2 shown in FIG. 3.

Figure 3:
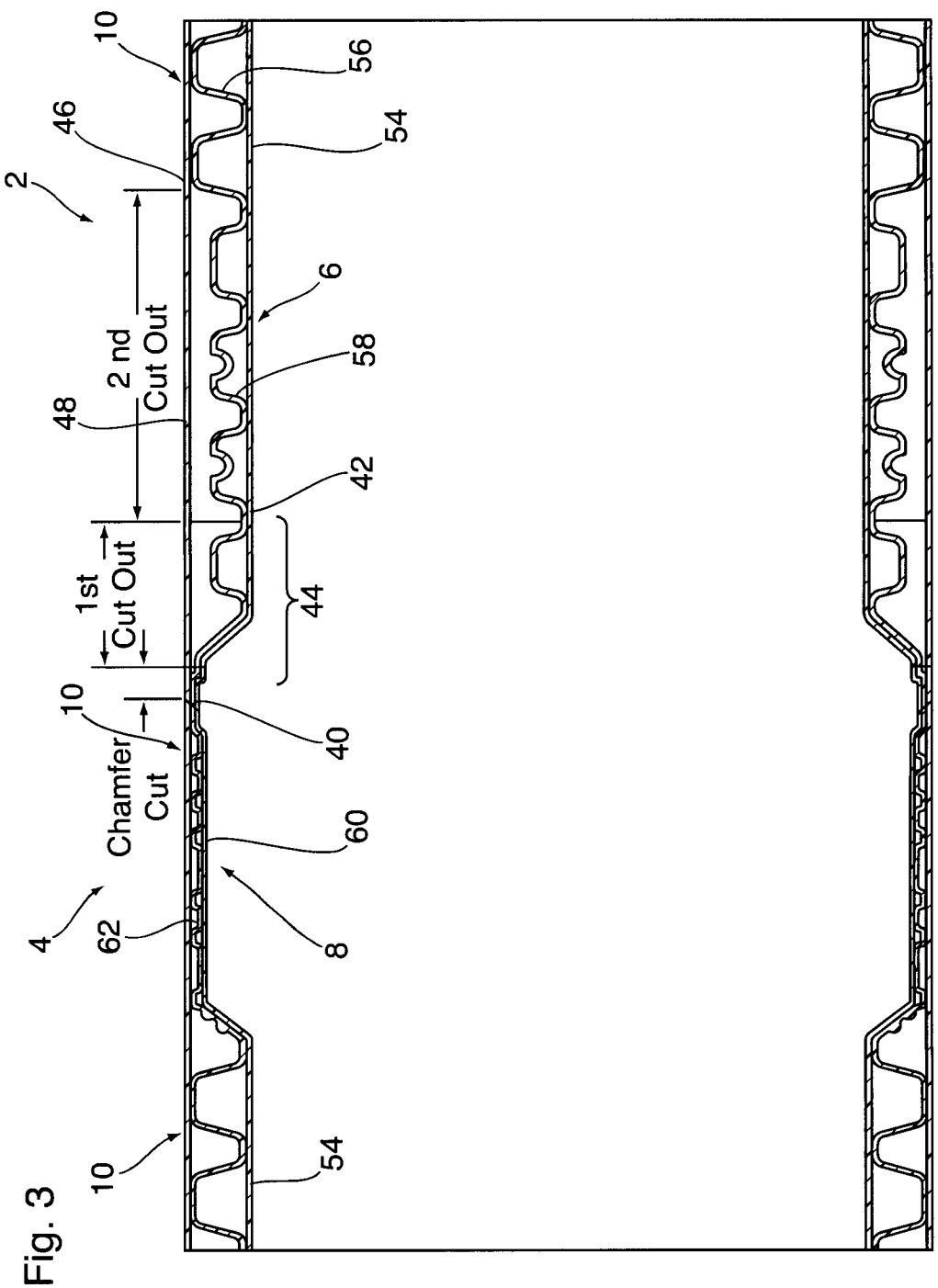
FIG. 3 is a partial perspective view showing the manufacture of the triple wall pipe with the inline connection prior to the cutting of the connector adjacent a middle portion thereof to form a pipe section with a spigot at one end and a different pipe section with a bellmouth connector at an end thereof.

FIG. 3 shows a portion of the corrugated pipe 2 after it has been manufactured and before cutting of the corrugated pipe to form individual pipe sections. The pipe sections 20 and 22 show details of the inline coupling 4 that includes both the bellmouth connector 8 and the spigot 6 where the spigot is designed to be received in a bellmouth connector 8 of a second pipe section.

The corrugated pipe 2 after the manufacture thereof is cut a number of times at a central position of the inline coupling 4. A chamfer cut 40 provides a tapered finished outer edge of the connecting sleeve 8 and separates pipe section 20 from the corrugated pipe. The spigot cut 42 is typically a straight cut through the pipe between corrugations to provide a double wall thickness edge at the end of the spigot 6. In light of the chamfer cut 40 and the spigot cut 42 a scrap portion 44 is removed and is recycled. In addition, a further sleeve wall cut 46 is made to allow removal of the outer sleeve wall portion 48 from over the spigot 6.

FIG. 1 shows the resulting pipe sections 20 and 22 with the pipe section 20 having the bellmouth connector 8 at the end of the pipe section with pipe section 22 having the spigot 6. Pipe section 20 would have a spigot at the opposite end of this pipe section and similarly the pipe section 22 would have a bellmouth connector 8 at an opposite end (not shown) of the pipe section.

With the present arrangement the sealing walls of the spigot (i.e. the outside walls) and the inner wall of the bellmouth connector are formed as part of the initial double wall forming step. The additional outer reinforcing wall is applied afterwards to surfaces away from the bellmouth connector/spigot interface. This arrangement is preferred as the sealing surfaces of the coupling are better controlled and the surfaces primarily contributing to the fit of the spigot in the bellmouth connector are not directly part of the third wall addition.

It is possible to have an inline coupling 4 which is two bellmouth connectors and a further inline coupling which is two spigots, however this requires additional mold blocks and the inline coupling as shown in the drawings having a spigot and a bellmouth connector is preferred.

The manufacture of double wall corrugated pipe (i.e. with an inner wall 54 of the corrugated pipe and the spigot in combination with the corrugated wall 56 of the pipe sections and the corrugated wall 58 of the spigot) is known. In addition, having such a pipe section with the outer sleeve wall 10 secured to the outside of the corrugated wall 56 of the pipe sections is also known and provides additional strength as the corrugations are effectively bridged or traversed on both the inside and outside edge of the pipe section. It is also known in such triple wall pipe to remove the scrap outer sleeve wall portion 48 from over the spigot.

The particular corrugated wall structure of the bellmouth connector 8 as shown in FIGS. 1 through 4 is new and has improved structural properties. Advantageously this bellmouth connector when used with the spigot 8 provides a coupling of increased strength.

The bellmouth connector 8 includes an outwardly displaced inner wall 60, a corrugated sleeve wall 62 and the outer sleeve wall 10. Adding the corrugated wall 62 and providing the corrugations in a particular manner has a number of benefits. The initial and primary benefit is additional strength of the bellmouth connector 8 as well as the additional strength of the overall coupling when a spigot 6 is inserted in a bellmouth connector 8.

The overall strength of corrugated pipe is relatively high and in particular triple wall corrugated pipe is of high strength due to the inner wall 54, the corrugations 56 and the outer sleeve wall 10. Unfortunately, although the pipe sections have high strength, and particularly high strength with respect to crushing, the inline coupling used with such double wall or triple wall pipe is of lower strength and thus the rating for the pipe section is reduced. The particular structure of the spigot in combination with the corrugated wall of the bellmouth connector 8 increases the strength of the coupling and thus the rating on the pipe sections is significantly increased. Furthermore the bellmouth connector 8 has additional rigidity and this rigidity is advantageous given that compressible seal members are typically provided on the spigot that engage both the spigot and the inside walls of the bellmouth connector 8 to form a seal. Such a compression seal is maintained by the bellmouth connector 8 resisting outward movement and the spigot resisting inward movement.

The previous practice of a double wall non-corrugated bellmouth connector and even a triple wall non-corrugated bellmouth connector fails to provide the higher strength of the corrugated wall bellmouth connector and spigot coupling as shown in the drawings and as described in the application (assuming similar amounts of material).

It has been found that the coupling of two pipe sections as shown in FIG. 2, where the bellmouth connector 8 has a corrugated wall significantly improves structural integrity and strength. The relative strength of the prior art as well as the present combination is shown in relative terms in FIG. 9.

As shown in FIGS. 1 and 2 the corrugated spigot 6 and the bellmouth connector 8 have a particular configuration and shape. The first corrugation 202 and the second corrugation 204 of the spigot each include a valley 206 and 208, respectively, that preferably receive a compressible 'O' ring seal. These valleys 206, 208 are opposite the inwardly extending shallow corrugations 210, 212 of the bellmouth connector when the spigot is coupled to a bellmouth connector as shown in FIG. 2. These corrugations 210, 212 provide an extended sealing surface as well as a reinforced sealing surface opposite the valleys for receiving the 'O' ring seals. A smaller same depth corrugation is provided between corrugations 210, 212 and provides additional stiffness. The width of corrugations 210, 212 is three to four times greater than the width of corrugation 214.

Different sealing arrangements can be used for example some installers prefer to use one or more larger 'O' rings located between corrugations. For some applications a single 'O' ring in one of the valleys is sufficient.

The free end 216 of the bellmouth connector includes a series of corrugations 218 similar to corrugator 214 and provides a stiff open end section.

The spigot includes an inner corrugation 220 that is opposite and cooperates with the series of corrugations 218.

FIGS. 5 through 8 show the apparatus used to apply the outer sleeve wall to a previously formed two wall corrugated pipe. The die tooling 100 includes a die outlet 102 for applying the outer sleeve wall to the corrugated pipe and also includes an air pressure outlet 104. The air pressure outlet includes an air pressure channel 106 connected to a variable air pressure supply 108. In addition, the die tooling 100 includes an associated sealing arrangement 110 (applied around the pipe) that allows the die tooling and the previously formed corrugated pipe to form a chamber therebetween allowing the pressure of the chamber to be varied during the application of the outer sleeve wall to the previously formed corrugated pipe. The die tooling 100 is preferably of a length longer than the connecting sleeve 8 of the corrugated pipe to simplify sealing.

In FIG. 5, the outer sleeve wall 10 is applied to and across the large corrugations of the pipe as the corrugated pipe is moved through the die tooling and through the vacuum tank and sizing bushing. The vacuum tank 120 is closed on an interior surface by the sizing bushing 122. The sizing bushing has a series of parts allowing a vacuum source to be applied to the extruded outer sleeve wall and to also assure contact of the outer sleeve wall with the corrugations. It can be seen that the space between corrugations of the pipe is subject to the air pressure that is established by the variable air pressure source 108, and this allows positive air pressure to be introduced pressurizing the cavities between corrugations. This arrangement reduces thermal deformation (inward deflection) that occurs when the triple wall pipe is cooled. By pressurizing the cavities before the outer sleeve wall is applied, the sealed cavities and in particular the outer sleeve wall undergoes less deformation that otherwise would occur due to the cooling of the pipe after forming. By increasing the pressure, the amount of thermal deformation is decreased.

In FIG. 6 it can be seen that the previously formed double wall corrugated pipe moves past the die outlet 102 and sleeve wall 10 is applied to the previously formed corrugated wall of the sleeve. Given that the corrugated sleeve wall 62 is close to the die outlet 102 the pressure is less important but it is generally maintained at the pressure for forming at the corrugations as shown in FIG. 5.

It can also be seen in FIGS. 5, 6 and 7 that the seal arrangement 110 engages the corrugations of the pipe as the pipe is moved therepast. This allows control of the pressure with respect to the space interior to the die tooling 100. This seal limits or blocks off atmospheric pressure. In FIG. 7 it can be seen that the connecting sleeve 8 is about to move past the die outlet 102 and the connecting wall 10 or the plastic coming out of the die outlet will be over the spigot portion of the inline connector. This can be appreciated from a review of FIGS. 7 and 8.

In FIG. 8, the spigot is below the die outlet 102 and it is desirable to maintain the connecting wall against the sizing bushing 122 and away from the corrugations of the spigot. This portion of the outer wall will be cut away in a subsequent downstream step and therefore controlling of the plastic such that it does not adhere to or come into contact with the corrugations of the spigot is highly desirable. Basically the corrugations of the spigot can be accurately formed by the mold blocks in the upstream forming process and these cooperate with the interior accurate surface of the connecting sleeve to allow for connection between pipes and is not affected by the outer sleeve wall.

It has been found that it is desirable to reduce the pressure provided through the air pressure outlet 104 when the connecting wall is over the corrugations of the spigot.

The air pressure provided to the cavity of the die tooling 100 will again be increased as the next row of full corrugations of the pipe section move past the die outlet.

It has been found that this arrangement for controlling of the outer sleeve wall during the attachment to the large corrugations of the pipe and to the outside of the corrugated connecting sleeve is beneficial. In addition, maintaining this outer sleeve wall away from the corrugations of the spigot also simplifies the subsequent cutting steps.

The outer sleeve wall over the spigot is maintained out of contact with the spigot and is subsequently removed. It is also possible to divert the extruded plastic using a sliding bypass valve whereby the plastic is removed during the extrusion process.

FIGS. 9A through D show a bellmouth pipe connector of the same wall thickness when made as a double wall corrugated pipe (FIG. 9A), a triple wall bellmouth pipe connector (FIG. 9B) and the preferred arrangement where the bellmouth connector is of a triple wall and the spigot is of a double wall construction (FIG. 9D). FIG. 9C is a double wall bellmouth connector and a double wall spigot. The relative strength of the structure of the structures is:

FIG. 9A RStiff=1.7 KN/m$^2$

FIG. 9B RStiff=3.0 KN/m$^2$

FIG. 9C RStiff$_{(when\ connected)}$=11.9 KN/m$^2$; and

FIG. 9D RStiff$_{(when\ connected)}$=18.5 KN/m$^2$.

The relative strength of the connected components is considerably higher and there is also increased strength of the bellmouth connectors alone. As shown in FIG. 9A the bellmouth connector includes corrugations with small enclosed air cavities spaced in the length of the bellmouth connector. This structure increases strength even though the wall thickness is slightly greater than the thickness of a double wall without cavities.

Although various preferred embodiments of the present invention have been described herein in detail, it will be appreciated by those skilled in the art, that variations may be made thereto without departing from the invention as defined in the appended claims.

The embodiments of the invention in which an exclusive property or privilege is claimed are defined as follows:

1. A method of forming an inline coupling in a triple walled corrugated pipe having an inner smooth tubular wall joined to a corrugated intermediate wall joined to an outer sleeve wall, said coupling including a triple walled bellmouth connector and a double walled spigot sized for receipt in said bellmouth connector, said method comprising:

providing coupling mold blocks in line with corrugated pipe mold blocks and using said coupling mold blocks to draw extruded plastic forming the corrugated intermediate wall outwardly from a centerline of the corrugated pipe being formed to form a corrugated intermediate wall of said bellmouth connector and a corrugated wall of said spigot as said coupling mold blocks move past an intermediate wall die outlet;

using air pressure to move extruded plastic forming said inner wall outwardly against an inner surface of said corrugated intermediate wall of said bellmouth connector and against an inner surface of said corrugated wall of said spigot; and applying the plastic forming said outer sleeve wall to join with an outer surface of said corrugated intermediate wall of said bellmouth connector to bridge between corrugations thereof and providing a positive pressure between said outer sleeve wall and an outer surface of said corrugated intermediate wall to maintain the plastic forming said outer sleeve wall of said pipe away from the outer surface of said corrugated wall of said spigot as the spigot moves past an outer wall die outlet such that the plastic forming the outer sleeve wall is spaced outwardly away from said spigot.

2. A method for forming triple walled corrugated pipe sections with an inline coupling between the pipe sections, said inline coupling including a double walled corrugated spigot and an associated triple walled bellmouth connector, with both the bellmouth connector and the spigot including a cylindrical inner wall with a diameter generally equal to the diameter of an inner cylindrical wall of said triple walled corrugated pipe, and with said bellmouth connector having an inner wall sized to receive the spigot therein, said method comprising;

using a series of travelling mold blocks in combination with extrusion equipment for forming corrugated walls and said inner walls of each of said pipe sections, said bellmouth connector and said spigot;

applying after the formation of said inner walls and said corrugated walls an outer sleeve wall joined to said corrugated walls of said pipe sections including said bellmouth connector; and providing air pressure between said outer sleeve wall and an outer surface of said corrugated walls to maintain said applied outer sleeve wall spaced outwardly and out of contact with said corrugated wall of said spigot and subsequently removing the outer sleeve wall from area over the spigot configured for receipt in said bellmouth connector.

3. A method as claimed in claim 2, further including cutting the pipe sections at the coupling separating said spigot and said bellmouth connector.

4. A method as claimed in claim 2, further including the steps of:

forming a seal with said corrugated wall; and providing a vacuum tank and sizing bushing, said steps of forming a seal and providing a vacuum tank and sizing bushing occurring after applying the outer sleeve wall joined to said corrugated walls of said pipe sections.

* * * * *